US011362618B2

(12) United States Patent
Teruel Hernandez et al.

(10) Patent No.: US 11,362,618 B2
(45) Date of Patent: Jun. 14, 2022

(54) SYSTEM AND METHOD FOR CONTROLLING A SOLAR PHOTOVOLTAIC INSTALLATION

(71) Applicant: SOLTEC ENERGIAS RENOVABLES, SL, Molina de Segura (ES)

(72) Inventors: Jose Alfonso Teruel Hernandez, Zarandona (ES); David Lozano Garcia, Murcia (ES); Miguel Angel Marin Hernandez, Murcia (ES)

( * ) Notice: Subject to any disclaimer, the term of this patent is extended or adjusted under 35 U.S.C. 154(b) by 56 days.

(21) Appl. No.: 17/052,913

(22) PCT Filed: Apr. 25, 2019

(86) PCT No.: PCT/EP2019/060624
§ 371 (c)(1),
(2) Date: Nov. 4, 2020

(87) PCT Pub. No.: WO2019/211162
PCT Pub. Date: Nov. 7, 2019

(65) Prior Publication Data
US 2021/0376784 A1   Dec. 2, 2021

(30) Foreign Application Priority Data
May 4, 2018   (EP) ................................ 18382311

(51) Int. Cl.
*H02S 20/32*   (2014.01)
(52) U.S. Cl.
CPC .................... *H02S 20/32* (2014.12)
(58) Field of Classification Search
CPC ...................................................... H02S 20/32
See application file for complete search history.

(56) References Cited

U.S. PATENT DOCUMENTS

2015/0318410 A1   11/2015   Higuma
2016/0329860 A1*  11/2016   Kalus ..................... H02S 20/10

FOREIGN PATENT DOCUMENTS

EP   2684218 A1   9/2012

OTHER PUBLICATIONS

Narbudowicz, Integration of Antennas with sun-tracking solar panels, Electronics Letters, Jul. 21, 2016, vol. 52, No. 15, pp. 1325-1327.

(Continued)

*Primary Examiner* — Jayne L Mershon
(74) *Attorney, Agent, or Firm* — Eugenio J. Torres-Oyola; Victor M. Rodriguez-Reyes; Rafael Rodriguez-Muriel

(57) ABSTRACT

System and method for controlling a photovoltaic installation (1), comprising a plurality of solar trackers (8), comprising a plurality of PV panels (9), rotatable around a rotation axis (5), arranged in several parallel rows at a given distance. Each solar tracker (8) has two antennas (2, 3) and at least one tracker controller. An external control unit (4) is connected to the solar trackers (8) of a central head-tracker row (20), which then communicates through a wireless bidirectional network (7), with the sub-tracker rows (30) using only one of the antennas (2, 3). A processing unit in each tracker controller executes an algorithm to determine which antenna (2, 3) is in an optimal position to transmit data or receive orders, requiring data of at least: an angular position and a strength and quality measurement of a radiofrequency signal, of each antenna for each solar tracker (8).

13 Claims, 2 Drawing Sheets

(56) References Cited

OTHER PUBLICATIONS

Gutierrez, Energetic analysis of simplified 2-position and 3-position North-South horizontal single-axis sun tracking concepts, Elsevier, vol. 157, Nov. 15, 2017, pp. 244-250.
Singh, An imperative role of sun trackers in phovoltaic technology: A review, Elsevier, vol. 82, Part 3, Feb. 2018, pp. 3263-3278.

* cited by examiner

SYSTEM AND METHOD FOR CONTROLLING A SOLAR PHOTOVOLTAIC INSTALLATION

TECHNICAL FIELD

The present invention relates to a solar photovoltaic (PV) installation and in particular, to a system for controlling said PV installation through the use of a plurality of communication antennas.

Furthermore, the PV installation of the present invention comprises a plurality of solar trackers, with each solar tracker being independently rotatable around a rotation axis and including a plurality of PV panels, arranged in a plurality of parallel rows, spaced at a given distance.

According to this invention, the plurality of parallel rows of solar trackers comprises a central head-tracker row in communication with a plurality of sub-tracker rows, wherein the only row which communicates directly with an external central controller is the central head-tracker row, acting as a proxy between said central controller and the associated sub-trackers.

STATE OF THE ART

The use of control systems for solar photovoltaic installations is known in the current state of the art, as well as the use of communications antennas attached to or integrated in solar or PV panels.

According to patent application nº US 2015/318410 A1, a photovoltaic panel disposed in a matrix is disclosed, which comprises a plurality of PV panels. Each PV panel comprises a plurality of antennas to communicate with antennas placed on adjoining solar PV panels. The PV panel further comprises a first antenna which functions as a receptor to receive a search command from the plurality of antennas, a plurality of antennas which function as transmitters to transmit a search command through said antennas, excluding the first antenna that received the initial search command, and wherein the first antenna also functions as a responder creating a response signal. This configuration enables the collection of information of the plurality of individual panels, such as: physical panel placement, power generation, wiring configuration or identifying failure of panels, as well as improving traceability of the plurality of PV panels.

However, the configuration of this patent application requires the use of multiple antennas on each PV panel simultaneously, wherein the multiple antennas are magnetic coils placed on each side of the PV panel.

On the other hand, patent application nº EP 2684218 A1, discloses a PV installation comprising a plurality of PV panels, wherein each PV panel includes a panel controller and at least two directional antennas arranged orthogonally in different transmission directions on each of said PV panels, and a central PV installation controller which communicates with said PV panels to control the transmission of locating signals and the reception of RSSI values from the plurality of PV panels to generate a map of said installation. The central controller sends a first command to a PV panel of the installation to transmit a first locating signal using one of the directional antennas in the direction of said one of the plurality of directional antennas to detect a first group of adjacent panels in that first direction and receive a first RSSI value, and a second command to transmit a second locating signal using a second, different, directional antenna in that direction to detect a second group of adjacent panels and receive a second RSSI value. The central controller receives these at least two RSSI values and repeats the process with a second PV panel and so on.

The configuration of said patent application employs at least two directional antennas arranged orthogonally on the PV panel, wherein each antenna is used sequentially (according to the central controller) to transmit and receive information from adjacent PV panels in the transmission direction of each directional antenna.

The aim of the present invention is to improve and optimize the communication between a plurality of adjacent parallel rows of PV panels or solar trackers, through the selection of one antenna from at least two antennas integrated in or attached to a PV panel or solar tracker on opposing sides, by determining which one of said antennas is an optimal position to further communicate orders or data with adjacent, parallel, rows which are spaced at a given known distance from an external central controller.

Another feature provided by this invention is that the central controller or gateway is configured for enabling it to communicate wirelessly, directly or indirectly, to each tracker associated using a mesh network topology with routing protocols or a star network topology. This configuration establishes all the trackers within the same hierarchy.

DISCLOSURE OF THE INVENTION

The present invention provides a system for controlling a solar photovoltaic (PV) installation, which comprises a plurality of solar trackers arranged in several parallel rows, with each row at a given distance. Each solar tracker includes a plurality of PV panels connected electrically in series, parallel or in a series-parallel configuration, and the solar trackers of each row being independently rotatable around a rotation axis. The parallel rows of solar trackers comprise a central head-tracker row and a plurality of sub-tracker rows, wherein the number of sub-tracker rows on either side of the central head-tracker row is limited to a predetermined number of sub-tracker rows according to the strength of the signal emitted by the central head-tracker row and a possible attenuation of the signal when going through certain mediums.

Furthermore, the control system of the PV installation requires the use of at least one tracker controller integrated in each solar tracker, wherein the control unit comprises at least a processor and a motorized actuator, an external control unit and a wireless bidirectional communications network between the rows of solar trackers, by means of a first communication antenna and a second communication antenna associated to each solar tracker. Said first and second antennas are placed on opposing sides of central PV panels of each solar tracker in each row, wherein said opposing sides of the central PV panels are parallel to the rotation axis, and the rotation axis is oriented in a North-South direction.

The external control unit is connected to the solar trackers of the central head-tracker row, through the use of a cable which in some embodiments of the invention is an RS-485 cable, and said wireless bidirectional communication network is a wireless network selected from those included in standard IEEE 802, and in some particular embodiments of the invention the wireless network, is a network selected from those included in standard IEEE 802.15.4 based, such as a Zigbee network, or others such as LoRa.

In order for a wireless communication to be established between the communication antennas of the solar trackers of the central head-tracker row, and the antennas of the solar trackers of the sub-tracker rows, the processor of each tracker controller is configured to execute an algorithm to determine which antenna is in an optimal position to transmit data or receive orders from the central head-tracker row to the sub-tracker rows in an east-west direction, when the tracker controllers of the central head-tracker row receive an order or data input from the external control unit of the PV installation.

In order to determine which antenna is in the optimal position to communicate with adjacent tracker rows, the algorithm operates using data of at least:
- an angular position of each, first and second, antenna in relation to the rotation axis of each solar tracker, wherein the solar tracker is limited or adjusted to an angular rotation ranging for example from +70° to −70° (in relation to the rotation axis); and
- a strength and a quality measurement of a radiofrequency signal of each antenna for each solar tracker.

In some embodiments of the invention, the system further comprises a gateway integrated in the external control unit, wherein said gateway is connected to the central head-tracker row using a cable, and the gateway can communicate with a predetermined amount of solar trackers according to the characteristics and technical features of the computer data storage installed in the gateway, such as a ROM (Read-Only Memory) and a RAM (Random-Access Memory).

In addition to the system, the present invention also provides a method for controlling a solar photovoltaic (PV) installation, wherein the photovoltaic installation comprises:
- a plurality of solar trackers arranged in several parallel rows, with each row at a given distance;
- wherein each solar tracker includes a plurality of PV panels connected electrically (in series, parallel or according to a combination thereof), and the solar trackers of each row being independently rotatable around a rotation axis;
- a first communication antenna and a second communication antenna associated to each solar tracker;
- at least one tracker controller integrated in each solar tracker wherein the tracker controller comprises at least a processor and a motorized actuator;
- an external control unit;
- a wireless bidirectional communications network between the rows of solar trackers using the cited first or second antennas;

and the method of said photovoltaic installation comprises the steps of:
- connecting the external control unit to the solar trackers of the central head-tracker row;
- arranging said first and second antennas on opposing sides of central PV panels of each solar tracker, wherein said opposing sides of the central PV panels are parallel to the rotation axis, and the rotation axis is oriented in a North-South direction;
- measuring for each solar tracker and for each angle of its rotation axis in relation to the position of the sun:
  - an angular position of each, first and second, communication antennas in relation to the rotation axis of each solar tracker;
  - a strength measurement of a radiofrequency signal of each communication antenna for each solar tracker; and
  - a quality measurement of the radiofrequency signal of each communication antenna for each solar tracker;
- selecting for each tracker one of the two communication antennas, depending on the values of angular position, strength and quality measured; and
- establishing a wireless communication between the antenna of the solar trackers of the central head-tracker row and the antenna of the solar trackers of the sub-tracker rows.

When the plurality of solar trackers of the plurality of tracker rows are in a horizontal position, meaning that the position of the sun has reached its zenith, any of the two antennas can be selected, with the only criteria for selection being the strength and quality measurements from both antennas.

In a preferred embodiment, the external central control unit, or the gateway connected to the central control unit, is configured to enable either a direct or an indirect wireless communication with each of the tracker controllers associated to each one of the solar trackers controlled by the central controller, or gateway, optionally using a mesh network topology with routing protocols or a star network topology.

Regardless of the network topology configuration selected, the chosen configuration includes all the solar trackers within the same hierarchy, eliminating the need for a head-tracker row and adjacent parallel sub-tracker rows.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and not limitative, in which.

DETAILED DESCRIPTION OF AN EMBODIMENT

Figure 1:
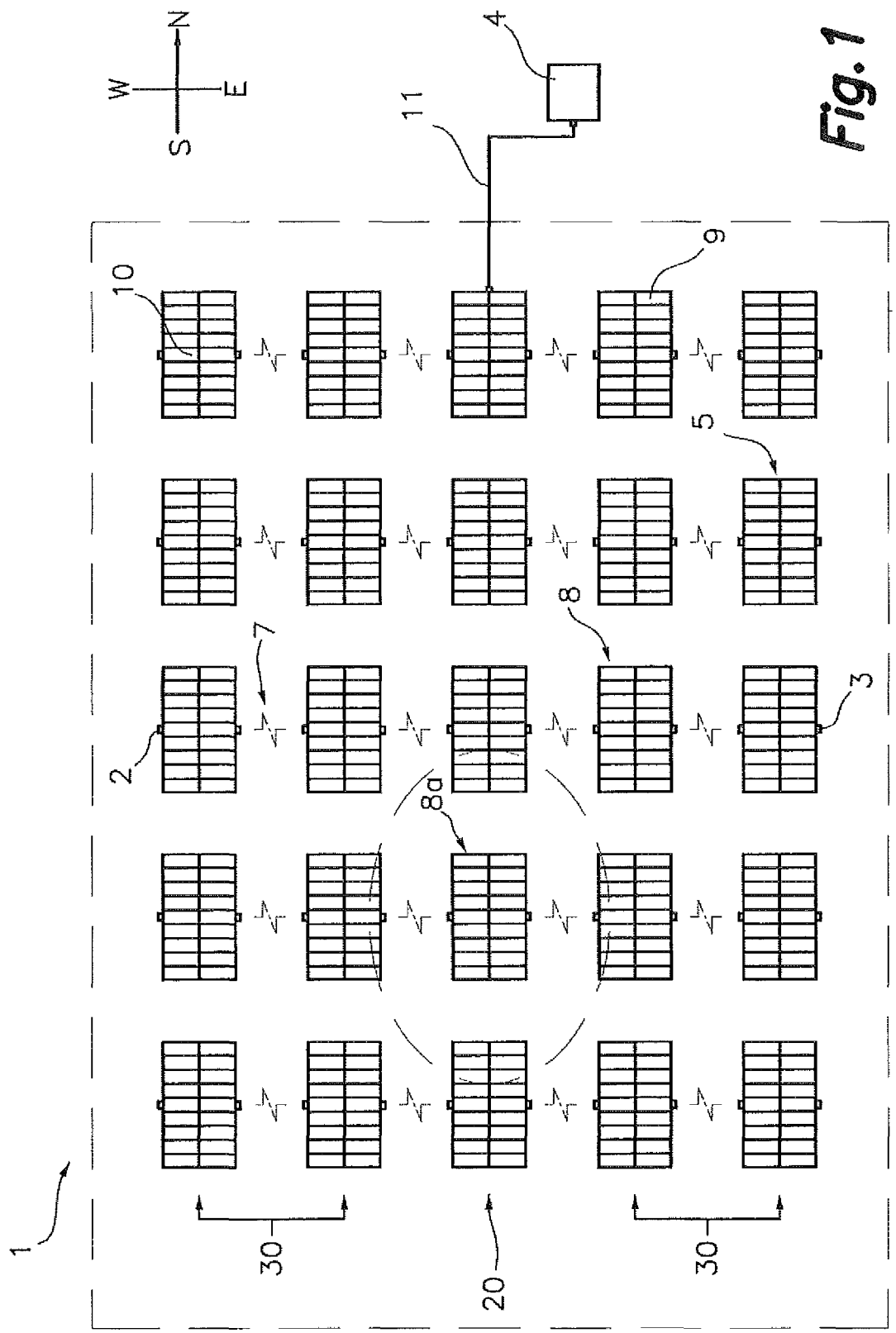
FIG. 1 depicts an overview of a possible embodiment of a photovoltaic installation including a control system.

The foregoing and other advantages and features will be more fully understood from the following detailed description of an embodiment with reference to the accompanying drawings, to be taken in an illustrative and not limitative, in which:

FIG. 1 depicts an overview of a particular embodiment of a photovoltaic (PV) installation 1 which includes a control system. The PV installation 1 comprises a plurality of parallel adjacent rows wherein said plurality of rows includes a central head-tracker row, 20, and four sub-tracker rows, 30, wherein two of said four sub-tracker rows 30 are on either side of the central head-tracker row 30. However, this particular embodiment only illustrates an example of a PV installation 1 and does not limit the number of sub-tracker rows, 30, on either side of the central head-tracker row, 20, wherein other PV installations 1, may include a different number of parallel rows, according to the range of the control system installed in each particular PV installation 1.

Each one of the tracker rows, 20 or 30, comprises a plurality of solar trackers 8 which are connected electrically in series, parallel or a combination thereof and each one of the tracker rows, 20 or 30, is independently rotatable around a rotation axis 5 which is oriented in a North-South direction.

Each solar tracker 8 comprises a tracker controller, which includes as a known technical feature at least a processor and a motorized actuator, a plurality of PV panels 9, a first communication antenna 2 and a second communication antenna 3, wherein both antennas 2 and 3, are attached to opposing sides of central PV panels 10 and both sides are parallel to the rotation axis 5 of the solar tracker 8.

The system for controlling the PV installation 1 comprises an external control unit 4 which is connected to the solar trackers 8 of the central head-tracker row 20 for instance through a cable 11, specifically an RS-485 cable although other known suitable cables may be used in other embodiments, wherein through said cable 11 the processor of each tracker controller of each solar tracker 8 of the central head-tracker row 20 sends and receives data from the external control unit, 4, establishing a bidirectional communication.

The processor, of each solar tracker 8 of the central head-tracker row 20, executes an algorithm to determine which communication antenna, either the first communication antenna 2 or the second communication antenna 3, is in an optimal position to relay said transmitted data to the antennas 2, 3 of the solar trackers 8 of the sub-tracker rows 30 on either side of the central head-tracker row 20 and therefore establishing a wireless communication through the use of a wireless bidirectional communications network 7. Said wireless communications network 7 may be any network from those included in standard IEEE 802.

To determine which one of the two communication antennas, 2 or 3, is in the optimal position to relay said transmission, the algorithm operates using data of at least:
  an angular position of each communication antenna, 2 and 3, in relation to the rotation axis 5;
  a strength measurement of a radiofrequency (RF) signal of each communication antenna, 2 and 3; and
  a quality measurement of said RF signal of each communication antenna, 2 and 3.

The way the optimal antenna of the two communication antennas, 2 or 3, of each solar tracker 8 of the central head-tracker row 20, is chosen to relay the data transmitted from the external control unit 4 is also used to determine which antenna, 2 or 3, communicates wirelessly between sub-tracker rows 30 parallel to the central head-tracker row 20.

In preferred embodiments of the invention the cable 11 is an RS-485 cable, and the network 7 is a network selected from those included in standard IEEE 802.15.4 based, such as a Zigbee network, or others such as LoRa.

Furthermore, for any photovoltaic installation 1 which includes at least a control system and a plurality of parallel adjacent rows including a central head-tracker row 20 and a plurality of associated sub-tracker rows 30, as disclosed in FIG. 1, if one or more tracker controllers of the solar trackers 8 of said central head-tracker 20 cannot establish a communication with their respective counterparts of one of the parallel sub-tracker rows 20, a multi-hop step is initiated. Therefore, the algorithm executed by the processor of the tracker controllers of each solar tracker 8 of the central head-tracker row 20, initiate said multi-hop step by communicating with the tracker controllers of the nearest sub-tracker row 30, in order for the tracker controllers of the nearest sub-tracker row 20 to repeat a message or signal sent by the central head-tracker row 20 to the other sub-tracker rows 20, ignoring the sub-tracker row 20 which couldn't establish a communication.

Figure 2:
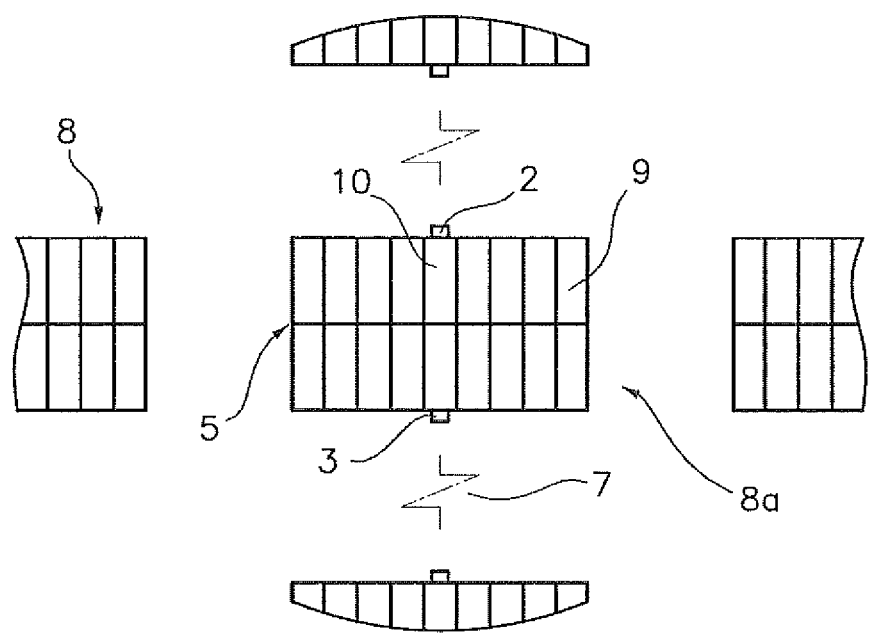
FIG. 2 illustrates a detailed view of a solar tracker included in the photovoltaic installation of FIG. 1, showing its interrelation with other adjacent solar trackers.

FIG. 2 depicts a view of a portion of the PV installation as seen circled in FIG. 1, to obtain a detailed view of a specific solar tracker 8a of the central head-tracker row 20 and how it can interact with the solar trackers 8 surrounding it in either the central head-tracker row 20 or parallel sub-tracker rows 30, directly facing it.

Said solar tracker 8a comprises a plurality of PV panels 9 and at least one tracker controller, which comprises at least a processor and a motorized actuator, wherein said motorized actuator rotates the solar tracker 8a around a rotation axis 5, independently from other solar trackers 8 of the central head-tracker row 20. All solar trackers 8 are limited to an angular rotation ranging from +70° to −70° around the rotation axis 5.

Furthermore, the solar tracker 8a comprises a first communication antenna 2 and a second communication antenna 3, wherein both antennas 2, 3 are placed on opposing sides of the central PV panels 10 from the plurality of PV panels 9, wherein said opposing sides of the central PV panels 10 are parallel to the rotation axis 5, oriented in a North-South direction.

The processor executes a specific algorithm which determines (using the cited acquired data) which one of the two communication antennas, 2 or 3, is in an optimal position to establish a wireless communication through the wireless bidirectional communications network 7, as described in FIG. 1, which is included in standard IEEE 802.

The communication antennas, 2 and 3, described in FIG. 1 and FIG. 2 are capable of conveying or relaying data or information in between the central head-tracker row 20 and the parallel sub-tracker rows 30, according to the information or instructions sent and/or required from the external control unit 4.

Figure 3:
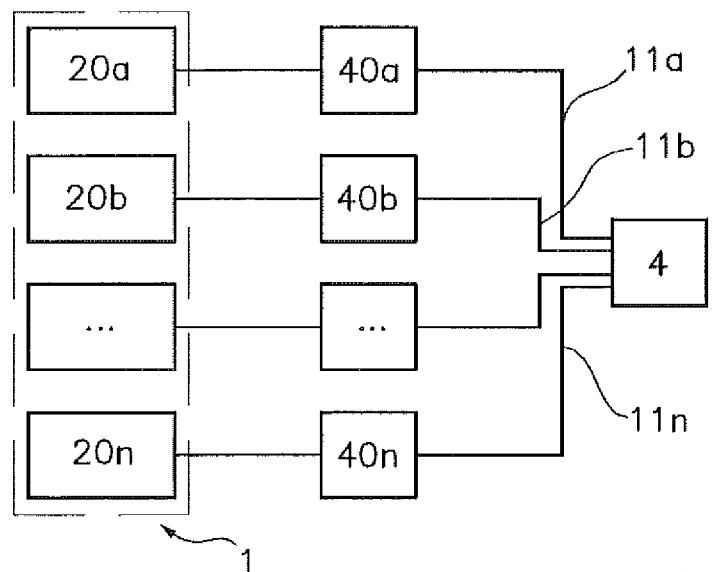
FIG. 3 depicts an overview of another possible embodiment of a photovoltaic installation including several central head-tracker rows, in a simplified way, wherein each of the central-tracker rows are connected to a gateway and the gateways are integrated in an external control unit.

FIG. 3 depicts an overview of another particular embodiment of a PV installation 1 including a control system, wherein said PV installation 1, as described in FIG. 1, further includes a plurality of gateways, 40a-40n, wherein the number of gateways 40 is equal to the number of central head-tracker rows 20 included in the PV installation 1, wherein each central head-tracker rows, 20a-20n, is connected through the use of a cable 11 to its respective gateway, 40a-40n, wherein said gateway 40a-40n is integrated in the external control unit 4 of the PV installation 1. In FIG. 3 the sub-tracker rows 30 associated to each of the central head-tracker rows, 20a-20n, have been omitted for the sake of clarity.

In particular embodiments of the invention, the PV installation 1 may only include one central head-tracker row 20 and related sub-tracker rows 30, as seen in FIG. 1, and therefore only require one single gateway 40.

However, in other embodiments of the invention, the PV installation 1 may include two or more central head-tracker rows 20a and 20b with their respective sub-tracker rows 30a and 30b, wherein both central head-tracker rows 20a and 20b are connected to their respective gateway 40a and 40b and both gateways are integrated in the external control unit 4 using a cable 11.

In either case, each gateway, 40, relays data from the external control unit 4 to each tracker controller of each solar tracker 8 of each individual central head-tracker row 20, wherein each gateway 40 may communicate with a predetermined number of solar trackers 8 according to the characteristics and technical features of each gateway 40.

In some embodiments of the invention the cable 11 is an RS-485 cable, and the wireless bidirectional communication network 7 is a network selected from those included in standard IEEE 802, and in further embodiments said network 7 is selected from those included in standard IEEE 802.15.4 based, such as a Zigbee network, or others such as LoRa.

It will be understood that various parts of one embodiment of the invention can be freely combined with parts described in other embodiments, even being said combination not explicitly described, provided there is no harm in such combination.

The invention claimed is:

1. A system for controlling a solar photovoltaic, PV, installation, comprising:
    a plurality of solar trackers arranged in several parallel rows, with each row at a given distance;
    each solar tracker including a plurality of PV panels connected electrically and the solar trackers of each row being independently rotatable around a rotation axis;
    a first communication antenna and a second communication antenna associated to each solar tracker;
    at least one tracker controller integrated in each solar tracker, the tracker controller comprising at least a processor and a motorized actuator;
    an external control unit; and
    a wireless bidirectional communications network between the rows of solar trackers using the cited first or second antennas;
    the parallel rows of solar trackers comprise a central head-tracker row and a plurality of sub-tracker rows, the external control unit being connected to the solar trackers of the central head-tracker row and the antennas of the solar trackers of the central head-tracker row being configured to wirelessly communicate with the antennas of the solar trackers of the sub-tracker rows;
    the first and second antennas are placed on opposing sides of central PV panels of each solar tracker in each row, the opposing sides of the central PV panels being parallel to the rotation axis, and the rotation axis being oriented in a North-South direction; and
    the processor of each tracker controller is configured to execute an algorithm to determine which antenna is in an optimal position to transmit or receive data from the central head-tracker row to the sub-tracker rows in an east-west direction,
    the algorithm operates using data of at least:
        an angular position of each, first and second, communication antennas in relation to the rotation axis of each solar tracker; and
        a strength and a quality measurement of a radiofrequency signal of each communication antenna for each solar tracker.

2. The system according to claim 1, wherein the plurality of PV panels are connected electrically in series, parallel or a combination of these two connection configurations.

3. The system according to claim 1, wherein the wireless bidirectional communication network is a wireless network selected from those included in standard IEEE 802.

4. The system according to claim 3, wherein the wireless network is a network selected from those included in standard IEEE 802.15.4 based, such as a Zigbee network, or LoRa.

5. The system according to claim 1, wherein the solar tracker is limited to an angular rotation ranging from +70° to −70° in relation to the rotation axis.

6. The system according to claim 1, further comprising a gateway integrated in the external control unit, the gateway being connected to the central head-tracker row through the use of a cable.

7. A method for controlling a solar photovoltaic installation, the photovoltaic installation comprising:
    a plurality of solar trackers arranged in several parallel rows, with each row at a given distance;
    each solar tracker including a plurality of PV panels connected electrically in series, parallel or a combination thereof, and the solar trackers of each row being independently rotatable around a rotation axis;
    a first communication antenna and a second communication antenna associated to each solar tracker;
    at least one tracker controller integrated in each solar tracker, the tracker controller comprising at least a processor and a motorized actuator;
    an external control unit; and
    a wireless bidirectional communications network between the rows of solar trackers using the cited first or second antennas;
wherein the method comprises:
    connecting the external control unit to the solar trackers of a central head-tracker row;
    arranging the first and second antennas on opposing sides of central PV panels of each solar tracker, the opposing sides of the central PV panels being parallel to the rotation axis, and the rotation axis being oriented in a North-South direction;
    measuring for each solar tracker and for each angle of its rotation axis in relation to the position of the sun:
        an angular position of each, first and second communication antennas in relation to the rotation axis of each solar tracker;
        a strength measurement of a radiofrequency signal of each communication antenna for each solar tracker; and
        a quality measurement of the radiofrequency signal of each communication antenna for each solar tracker;
    selecting for each tracker one of the two communication antennas, depending on the values of angular position, strength and quality measured; and
    establishing a wireless communication between the antenna of the solar trackers of the central head-tracker row and the antenna of the solar trackers of the sub-tracker rows.

8. The method according to claim 7, wherein when the solar trackers are in a horizontal position, any of the two communication antennas can be selected, with the only criteria for selection being the strength and quality measurements thereof.

9. The method according to claim 7, wherein the wireless bidirectional communication network is a wireless selected from those included in standard IEEE 802.

10. The method according to claim 9, wherein the wireless network is a network selected from those included in standard IEEE 802.15.4 based, such as a Zigbee network, or others such as LoRa.

11. The method according to claim 7, wherein the solar trackers are limited to an angular rotation ranging from +70° to −70° in relation to the rotation axis.

12. The method according to claim 7, wherein the wireless bidirectional communication network establishes either a direct or an indirect communication between a gateway connected to the external control unit and each of the tracker controllers associated to each one of the plurality of solar trackers.

13. The method according to claim 12, wherein the direct or indirect communication between the gateway and the plurality of solar trackers through the use of routing protocols associated with a network topology selected from a group comprising a star configuration and a mesh configuration.

* * * * *